United States Patent
Yamaguchi (10) Patent No.: US 9,181,016 B2
(45) Date of Patent: Nov. 10, 2015

(54) INJECTION APPARATUS

(75) Inventor: Kazuyuki Yamaguchi, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 48 days.

(21) Appl. No.: 14/125,647

(22) PCT Filed: Jun. 25, 2012

(86) PCT No.: PCT/JP2012/066157
§ 371 (c)(1),
(2), (4) Date: Dec. 12, 2013

(87) PCT Pub. No.: WO2013/005598
PCT Pub. Date: Jan. 10, 2013

(65) Prior Publication Data
US 2014/0131391 A1  May 15, 2014

(30) Foreign Application Priority Data
Jul. 6, 2011 (JP) ................... 2011-150263

(51) Int. Cl.
*B22D 17/32* (2006.01)
*B65D 83/00* (2006.01)
(Continued)

(52) U.S. Cl.
CPC ............ *B65D 83/0022* (2013.01); *B22D 17/32* (2013.01); *B29C 45/531* (2013.01); *B29C 45/82* (2013.01)

(58) Field of Classification Search
CPC ....................................................... B22D 17/32
USPC ................................................. 164/312, 113
See application file for complete search history.

(56) References Cited

U.S. PATENT DOCUMENTS 4,023,466 A * 5/1977 Strassheimer ...................... 91/6
4,044,653 A * 8/1977 Aoki ............................... 91/392
(Continued)

FOREIGN PATENT DOCUMENTS

CN  1394735  2/2003
CN  1546302  11/2004
(Continued)

OTHER PUBLICATIONS

Chinese Official Action for Chinese Application No. 201280031467.1 dated Nov. 4, 2014.
(Continued)

*Primary Examiner* — Kevin P Kerns
(74) *Attorney, Agent, or Firm* — Greenblum & Bernstein, P.L.C.

(57) ABSTRACT

An injection apparatus includes an actuating cylinder, an accommodating chamber, and a volume changing part capable of changing the volume of the accommodating chamber. The actuating cylinder has an operation chamber and a piston accommodated in the operation chamber, and supplies an incompressible fluid to the injection cylinder by forcing out the incompressible fluid inside the operation chamber with the piston. The accommodating chamber is connected to the operation chamber, and holds at least some of the incompressible fluid that flows out from the operation chamber due to the piston being pushed out. The volume changing part expands the volume of the accommodating chamber, at the latest simultaneously with the start of acceleration of the actuating cylinder, and stops the expansion of the volume when the operating speed of the piston of the actuating cylinder has reached a desired speed.

5 Claims, 5 Drawing Sheets

(51) Int. Cl.
*B29C 45/82* (2006.01)
*B29C 45/53* (2006.01)

(56) References Cited

U.S. PATENT DOCUMENTS

| | | | |
|---|---|---|---|
| 5,299,626 | A | 4/1994 | Iwamoto |
| 5,887,641 | A | 3/1999 | Iwamoto et al. |
| 2009/0242161 | A1 | 10/2009 | Uchida et al. |
| 2010/0000699 | A1* | 1/2010 | Uchida et al. ............ 164/113 |

FOREIGN PATENT DOCUMENTS

| | | |
|---|---|---|
| EP | 2295171 | 3/2011 |
| JP | 02/142664 | 5/1990 |
| JP | 06-134829 | 5/1994 |
| JP | 09-052164 | 2/1997 |
| JP | 10-146664 | 6/1998 |
| JP | 2008-155280 | 7/2008 |
| JP | 2010-115683 | 5/2010 |
| WO | 2008152665 | 12/2008 |

OTHER PUBLICATIONS

U.S. Appl. No. 14/125,617 to Kazuyuki Yamaguchi, which was filed on Dec. 12, 2013.
International Preliminary Report on Patentability for PCT/JP2012/066157 (English-language translation).
Extended Search Report for EP 12807355.8 having a mailing date of Feb. 19, 2015.

* cited by examiner

INJECTION APPARATUS

FIELD OF THE INVENTION

The present invention relates to an injection apparatus which injects a molding material into a mold and fills the mold with the molding material.

BACKGROUND OF THE INVENTION

Injection apparatuses are known as apparatuses for molding a desired product by injecting a molding material into a mold and filling the mold with the molding material. See Patent Document 1, for example. The injection apparatus of this type generally operates in three steps: a low-speed step, a high-speed step and a pressure-increasing step; operates the piston of an injection cylinder at a desired speed in the respective steps; and also operates to impart a desired pressure to the molding material in a mold.

PRIOR ART DOCUMENT

Patent Document

Patent Document 1: Japanese Laid-Open Patent Publication No. 2010-115683

SUMMARY OF THE INVENTION

In the injection apparatus, it is necessary to reduce the molding cycle, and also to inject a molding material to fill the mold with the molding material before completion of the solidification of the molding material in a mold. Therefore, it is desired for the injection apparatus to highly accelerate the operation of an injection cylinder for injecting the molding material.

An object of the present invention is to provide an injection apparatus which can highly accelerate the operation of the injection cylinder.

In order to solve the above problem, one aspect of the present invention provides an injection apparatus which injects a molding material into a mold by operating an injection cylinder, and fills the mold with the molding material. The injection apparatus includes an actuating cylinder which has an operation chamber and a piston that is accommodated in the operation chamber and supplies an incompressible fluid to the injection cylinder by forcing out the incompressible fluid inside the operation chamber with the piston, an accommodating chamber which is connected to the operation chamber, and holds at least some of the incompressible fluid that flows out from the operation chamber due the piston being pushed out, and a volume changing part capable of changing the volume of the accommodating chamber, which expands the volume of the accommodating chamber, at the latest simultaneously with the start of acceleration of the actuating cylinder, and stops the expansion of the volume when the operating speed of the piston of the actuating cylinder has reached a desired speed.

DETAILED DESCRIPTION OF THE PREFERRED EMBODIMENTS

First Embodiment

Hereinafter, an injection apparatus according to a first embodiment of the present invention will be explained in accordance with FIGS. 1 to 3.

Figure 1:
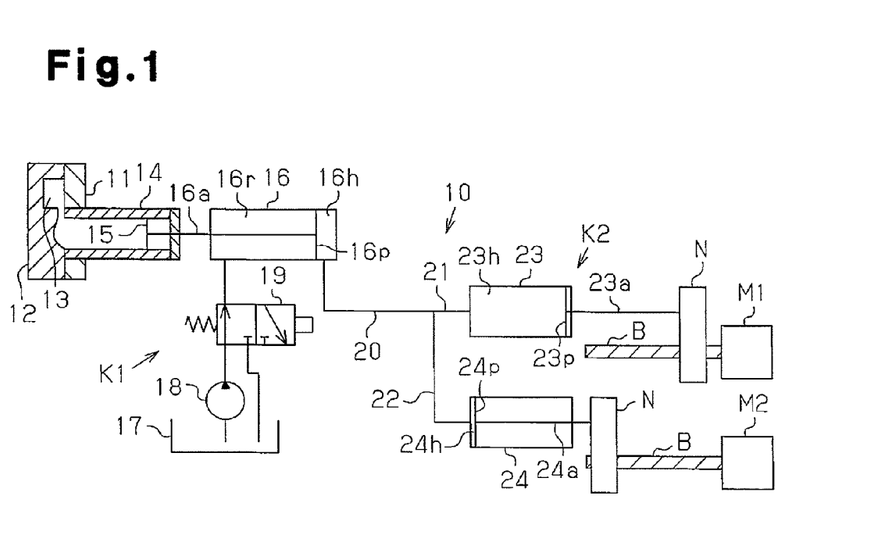
FIG. 1 is a schematic view showing an injection apparatus according to a first embodiment of the present invention.
Figure 2A:
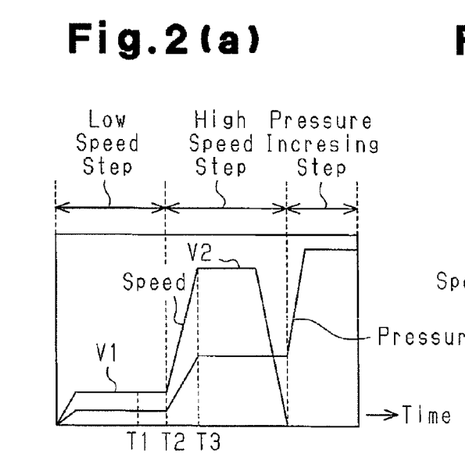
FIG. 2(a) is a schematic view showing the operating pattern of an injection cylinder of the injection apparatus in FIG. 1.

A die cast machine 10 as the injection apparatus shown in FIG. 1 is an apparatus which injects a metal material (for example, aluminum) as a molten molding material into a cavity 13 formed by a fix mold 11 and a movable mold 12 which constitute a mold, and fills the cavity 13 with the metal material. The molding material injected into the mold is taken out after solidification, thereby forming a desired molded article. In the meantime, the fix mold 11 and the movable mold 12 are subjected to mold opening/closing and mold clamping by use of a mold clamping device not shown.

The metal material is supplied into an injection sleeve 14 which is in communication with the cavity 13. An injection plunger 15 which forces out the metal material supplied into the injection sleeve 14 into the cavity 13 is housed in the injection sleeve 14. The die cast machine 10 includes an injection cylinder 16 which drives the injection plunger 15. The injection plunger 15 is coupled to a piston rod 16a of the injection cylinder 16. A supplying/discharging mechanism K1 is connected to a rod side chamber 16r of the injection cylinder 16. The supplying/discharging mechanism K1 supplies hydraulic oil as an incompressible fluid to the rod side chamber 16r and discharges the hydraulic oil within the rod side chamber 16r. The supplying/discharging mechanism K1 includes an oil tank 17, a pump 18 which pumps up the hydraulic oil within the oil tank 17, and an electromagnetic switching valve 19 which switches a flow channel through which hydraulic oil flows. The electromagnetic switching valve 19 switches the flow channel between a route which enables the supply of the pumped-up hydraulic oil to the rod side chamber 16r and a route which enables the discharge of the hydraulic oil within the rod side chamber 16r into the oil tank 17. A supplying/discharging mechanism K2 is connected to a head side chamber 16h of the injection cylinder 16. The supplying/discharging mechanism K2 supplies hydraulic oil to the head side chamber 16h and discharges the hydraulic oil within the head side chamber 16h.

Hereinafter, the supplying/discharging mechanism K2 of this embodiment will be explained in detail.

A main line 20, which serves as a supply route and a discharge route for hydraulic oil, is connected to the head side chamber 16h of the injection cylinder 16. A plurality of sub lines 21, 22, which serve as supply routes and discharges routes for hydraulic oil, are formed to be branched from the main line 20. An actuating cylinder 23 which supplies hydraulic oil to the injection cylinder 16 is connected to a sub line 21. A head side chamber 23h as an operation chamber of the actuating cylinder 23 is connected to the sub line 21. A piston rod 23a of the actuating cylinder 23 is coupled to a nut N. The nut N is screwed with a ball screw B to be rotated by a servo motor M1 as an electric motor.

A housing cylinder 24 as a cylinder different from the actuating cylinder 23 is connected to the sub line 22. A head side chamber 24h as an accommodating chamber for the housing cylinder 24 is connected to the sub line 22. A piston rod 24a of the housing cylinder 24 is coupled to a nut N. The nut N is screwed with a ball screw B to be rotated by a servo motor M2 as an electric motor.

The injection cylinder 16, in the die cast machine 10 of this embodiment, operates due to the hydraulic oil within the head side chamber 23h of the actuating cylinder 23 being supplied to the head side chamber 16h of the injection cylinder 16. Therefore, the injection cylinder 16 is set to have a volume size which enables an inflow of the hydraulic oil from the actuating cylinder 23. Also, the head side chamber 23h of the actuating cylinder 23 and the head side chamber 24h of the housing cylinder 24 are connected by the sub lines 21, 22.

The actuating cylinder 23 and the housing cylinder 24 are such that the operation of the respective pistons 23p, 24p is controlled by servo control of the respective servo motors M1, M2.

Next, the operating pattern (injection pattern) of the injection cylinder 16 at the time of injection will be explained in accordance with FIG. 2(a).

The injection cylinder 16 operates in three steps: a low-speed step, a high-speed step and a pressure-increasing step. The low-speed step is an initial-stage step of injection, involving operating the piston 16p of the injection cylinder 16 at a low speed when the metal material supplied into the injection sleeve 14 is forced out into the cavity 13. The high-speed step is a step to be carried out subsequent to the low-speed step, involving operating the piston 16p of the injection cylinder 16 at a higher speed than in the low-speed step. Rapid acceleration to a desired speed is required in this high-speed step. The pressure-increasing step is a final-stage step of injection to be carried out subsequent to the high-speed step, involving increasing the pressure to be imparted to the metal material within the cavity 13 by the force in a forward movement direction of the piston 16p of the injection cylinder 16.

In the die cast machine 10 of this embodiment, the acceleration performance of the operation of the injection cylinder 16 in the high-speed step is improved by the actuating cylinder 23 and the housing cylinder 24.

Hereinafter, the operation (operating mode) of the die cast machine 10 of this embodiment will be explained in detail by use of FIGS. 1 to 3.

Firstly, in the low-speed step, the speed of the servo motor M1 is controlled such that the piston 23p of the actuating cylinder 23 moves forward (leftward operation in FIG. 1) at an injection speed V1 of the injection cylinder 16 in the low-speed step from the state shown in FIG. 1. On the other hand, the operation of the housing cylinder 24 is stopped until a timing T1 which will be explained later.

At the timing T1 close to the end of the low-speed step, the servo motor M2 which drives the housing cylinder 24 moves the piston 24p backward (rightward operation in FIG. 1) and the speed of the servo motor M1, which drives the actuating cylinder 23, is increased. The rotating speed of the servo motors M1, M2 is set to keep the injection speed V1 of the injection cylinder 16 for a period between the timing T1 and a timing T2 which will be explained later. The backward movement of the piston 24p expands the volume of a head side chamber 24h. The head side chamber 24h functions as an accommodating chamber in which the hydraulic oil that flows out from the head side chamber 23h of the actuating cylinder 23 is held.

At the timing T2 for starting the high-speed step, the backward movement speed of the housing cylinder 24 is reduced, and the speed of the servo motor M1 which drives the actuating cylinder 23 is increased to a speed corresponding to the injection speed V2 of the injection cylinder 16 in the high-speed step.

Figure 3A:
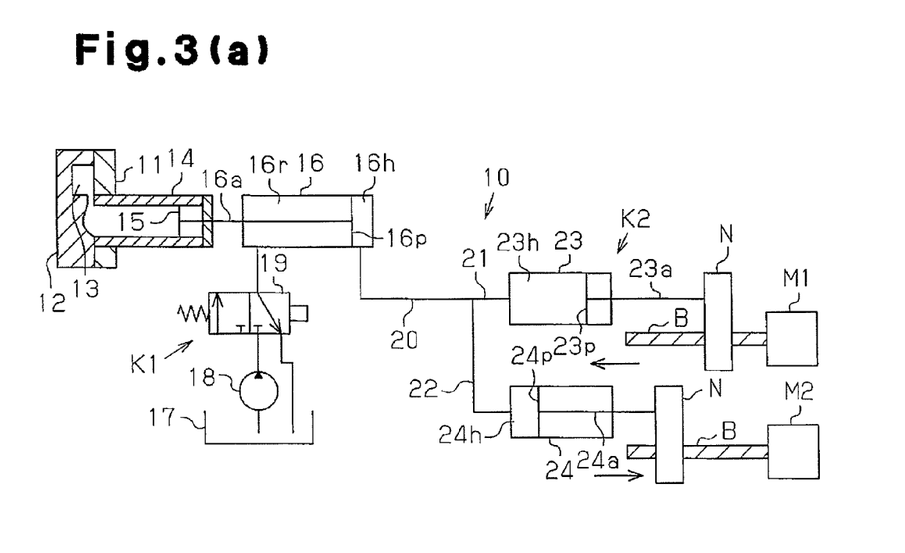
FIGS. 3(a) and 3(b) are schematic views showing the operating state of the injection apparatus in FIG. 1.

Due to the above control, as shown in FIG. 3(a), the forward movement of the nut N screwed with the ball screw B by the rotation of the servo motor M1 imparts driving force via the nut N and the piston rod 23a to the piston 23p of the actuating cylinder 23 so that the piston 23p moves forward. On the other hand, as shown in FIG. 3(a), the backward movement of the nut N screwed with the ball screw B by the rotation of the servo motor M2 imparts driving force via the nut N and the piston rod 24a to the piston 24p of the housing cylinder 24 so that the piston 24p moves backward.

Upon control of the actuating cylinder 23 and the housing cylinder 24 in such a manner, the hydraulic oil forced out by the piston 23p of the actuating cylinder 23 flows into the head side chamber 24h of the housing cylinder 24 through the sub lines 21 and 22 in turn. Specifically, in the housing cylinder 24, the volume of the head side chamber 24h expands due to the backward movement of the piston 24p with the decreasing volume of the head side chamber 23h due to the forward movement of the piston 23p of the actuating cylinder 23 (see FIG. 3(a)). As a result, some of the hydraulic oil forced out from the actuating cylinder 23 flows into the head side chamber 24h of the housing cylinder 24.

When the speed of the piston 23p of the actuating cylinder 23 reaches a desired speed corresponding to the injection speed V2 of the injection cylinder 16 (timing T3), the servo motor M2 is controlled to stop the operation of the piston 24p of the housing cylinder 24. The control of the piston 23p of the actuating cylinder 23 maintains the current state.

Figure 3B:
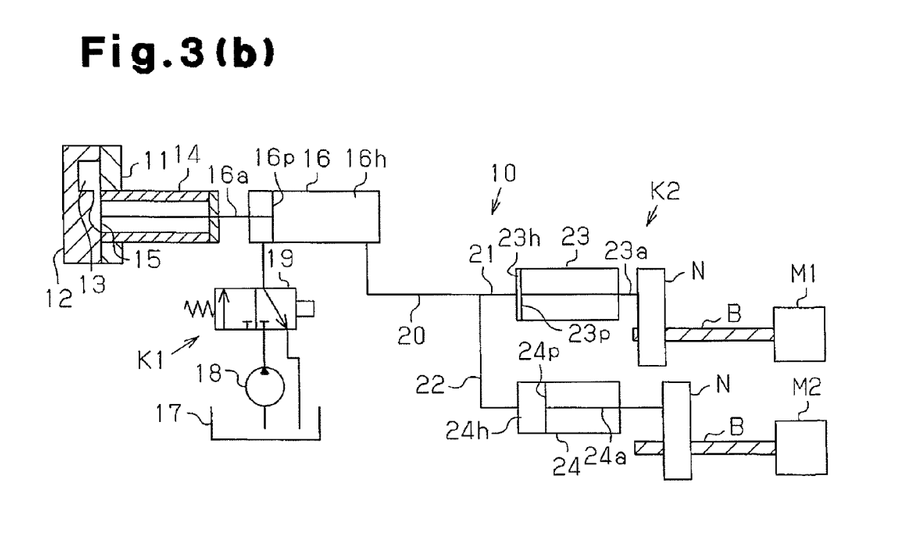

Once the operation of the piston 24p of the housing cylinder 24 stops, the expansion of the volume of the head side chamber 24h of the housing cylinder 24 also stops as shown in FIG. 3(b). Therefore, all the hydraulic oil forced out from the head side chamber 23h of the actuating cylinder 23 flows into the head side chamber 16h of the injection cylinder 16 through the main line 20. Due to this, the operating speed of the piston 16p of the injection cylinder 16 is maintained at the injection speed V2. In this embodiment, the volume changing part is composed of the piston 24p of the housing cylinder 24 and the servo motor M2.

Figure 2B:
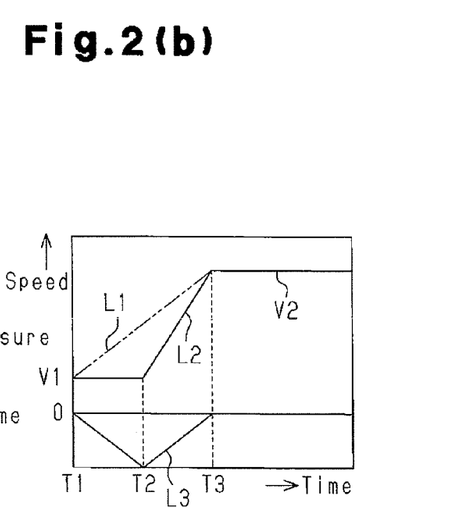
FIG. 2(b) is a schematic view showing the speed pattern of the injection cylinder of the injection apparatus.

FIG. 2(b) shows the speed pattern by the above control. L1 in FIG. 2(b) is the speed pattern of the injection cylinder 16 when the above control is not carried out. That is, L1 is a speed pattern of the injection cylinder 16 when the injection cylinder 16 is operated by the actuating cylinder 23 alone. L2 in FIG. 2(b) is a speed pattern of the injection cylinder 16 when the above control is carried out. L3 in FIG. 2(b) is a speed pattern of the housing cylinder 24 when the above control is carried out. In the meantime, after completion of injection molding, the hydraulic oil within the head side chamber 16h of the injection cylinder 16 and the head side chamber 24h of the housing cylinder 24 is returned back to the head side chamber 23h of the actuating cylinder 23 through a circuit for returning oil not shown.

As shown in FIG. 2(b), at the beginning of the operation of the piston 24p of the housing cylinder 24 (timing T1 in the figure), some of the hydraulic oil forced out from the actuating cylinder 23 is flowed into the head side chamber 24h (accommodating chamber) of the housing cylinder 24, as described above. At this time, the amount of the hydraulic oil flowing into the head side chamber 16h of the injection cylinder 16 and the amount of the hydraulic oil flowing into the head side chamber 24h of the housing cylinder 24 are set such that the piston 16p of the injection cylinder 16 keeps the injection speed V1. The piston 24p of the housing cylinder 24 starts to decelerate, and also the acceleration of the actuating cylinder 23 is started (timing T2 in the figure). Since the expansion of the head side chamber 24h is maintained also during the deceleration of the piston 24p of the housing cylinder 24, the acceleration of the actuating cylinder 23, i.e., the acceleration of the piston 16p of the injection cylinder 16 is rapidly carried out. Thereafter, when the speed of the piston 23p of the actuating cylinder 23 reaches a desired speed (symbol "V2" in the figure), the operation of the piston 24p of the housing cylinder 24 is stopped, and simultaneously the piston 16p of the injection cylinder 16 reaches the injection speed V2 (timing T3 in the figure).

As shown in the speed pattern in FIG. 2(b), according to the control of this embodiment, the time between when the piston 16p of the injection cylinder 16 starts to accelerate and when it reaches the injection speed V2 (timing T2 to timing T3) is shorter than the time between when the piston 16p of the injection cylinder 16 starts to accelerate and when it reaches the injection speed V2 (timing T1 to timing T3) in the case where the actuating cylinder 23 is singly controlled. That is, the acceleration performance of the piston 16p of the injection cylinder 16 would be improved by the control of this embodiment.

Upon control of this embodiment, some of the hydraulic oil flowing out from the head side chamber 23h of the actuating cylinder 23 is accommodated in the head side chamber 24h of the housing cylinder 24 during the acceleration of the piston 23p. This is based on an idea that motor torque of the servo motor M1 which drives the actuating cylinder 23 is used exclusively for the acceleration of the piston 23p and the ball screw B as well as the servo motor M1 itself so that the acceleration performance of the piston 16p of the injection cylinder 16 can be improved. The motor torque is divided into a torque fraction necessary for acceleration of the piston 23p and the ball screw B as well as the servo motor M1 itself, and a torque fraction necessary for resisting the back pressure. In the control of this embodiment, the hydraulic oil flowing out from the actuating cylinder 23 is drawn out by the housing cylinder 24 to suppress the rise in back pressure at the time of acceleration of the piston 23p of the actuating cylinder 23. As a result, the motor torque is used exclusively for the acceleration of the actuating cylinder 23, and thus the acceleration performance of the piston 23p and therefore the piston 16p can be improved. In the meantime, the piston 16p of the injection cylinder 16 operates with the hydraulic oil supplied from the actuating cylinder 23, and thus the improvement in acceleration performance of the actuating cylinder 23 would lead to the improvement in acceleration performance of the injection cylinder 16.

Thus, according to this embodiment, the following advantages can be obtained.

(1) When the operating speed of the actuating cylinder 23 is increased from the speed corresponding to the injection speed V1 to the speed corresponding to the injection speed V2, some of the hydraulic oil flowing out from the actuating cylinder 23 is supplied to the head side chamber 24h of the housing cylinder 24. Thus, no motor torque for resisting the rise in back pressure applied to the piston 23p of the actuating cylinder 23 at the time of acceleration is needed, so that the operation of the injection cylinder 16 can be highly accelerated. Specifically, the performance of the servo motor M1 can be maximally exerted.

(2) When the operation of the injection cylinder 16 is highly accelerated, such acceleration can be carried out using a servo motor identical with a conventional one without employing a high-performance servo motor, which can thus contribute to the suppression of the cost increase of the die cast machine 10.

(3) The highly acceleration of the operation of the injection cylinder 16 in the high-step can reduce the molding cycle. By reducing the molding cycle, the improvement in product quality can also be expected.

Second Embodiment

Hereinafter, a second embodiment in which the present invention has been embodied will be explained in accordance with FIGS. 4 and 5. In the meantime, for the second embodiment which will be explained later, the overlapping explanation about the same arrangement as that of the already-explained first embodiment will be omitted or simplified.

Figure 4:
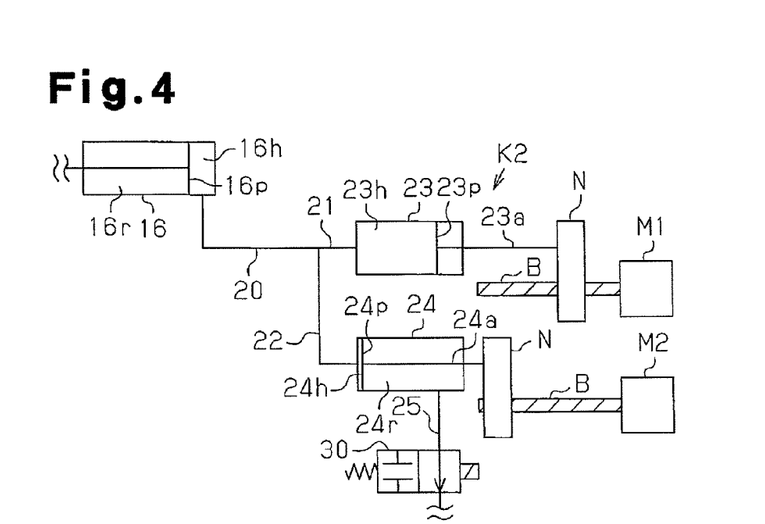
FIG. 4 is a schematic view showing an injection apparatus according to a second embodiment of the present invention.
Figure 5:
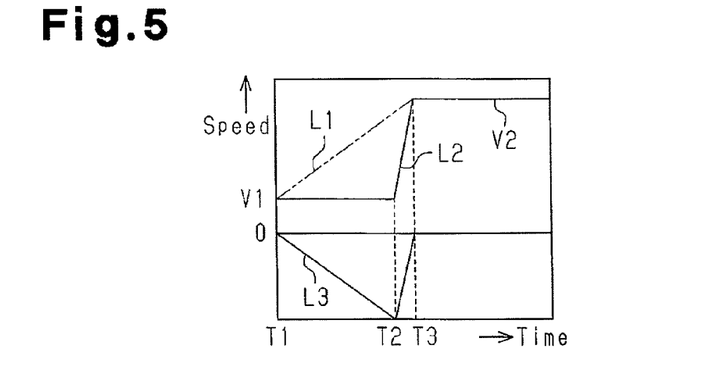
FIG. 5 is a schematic view showing the speed pattern of the injection cylinder of the injection apparatus shown in FIG. 4.

FIG. 4 shows only an arrangement necessary to explain the second embodiment, and the arrangement not shown is identical with that of the first embodiment.

In the second embodiment, a rod side chamber 24r of the housing cylinder 24 is provided with a line 25 which discharges hydraulic oil out of the rod side chamber 24r, and an electromagnetic switching valve 30 is intervened in the line 25. The electromagnetic switching valve 30 can selectively take two positions: an opening position which makes it possible to discharge hydraulic oil and a closing position which makes it impossible to discharge hydraulic oil.

At the timing T2 close to the end of the low-speed step, the electromagnetic switching valve 30 is switched from the opening position which makes it possible to discharge hydraulic oil to the closing position which makes it impossible to discharge hydraulic oil. Due to this, the housing cylinder 24 cannot discharge hydraulic oil out of the rod side chamber 24r, and stops. Specifically, the expansion of the volume of the head side chamber 24h of the housing cylinder 24 stops. In this embodiment, the electromagnetic switching valve 30 functions as a forcible stopping part which forcibly stops the operation of the piston 24p of the housing cylinder 24 separately from the control of the servo motor M2 as a drive part of the housing cylinder 24.

According to this arrangement, the time between when the piston 24p of the housing cylinder 24 starts to decelerate and when it stops (timing T2 to timing T3 in the figure) is reduced. As a result, as shown in the speed pattern in FIG. 5, according to the control of this embodiment, the time between when the piston 16p of the injection cylinder 16 starts to accelerate and when it reaches the injection speed V2 (timing T2 to timing T3) is further shorter than the time between when the piston 16p of the first embodiment starts to accelerate and when it reaches the injection speed V2 (timing T2 to timing T3 in FIG. 2(b)). That is, the acceleration performance of the piston 16p of the injection cylinder 16 would be further improved by the control of this embodiment.

Thus, according to this embodiment, the following effects can be obtained in addition to the effects (1) to (3) of the first embodiment.

(4) Since the operation of the piston 24p of the housing cylinder 24, i.e., the expansion of the volume of the head side chamber 24h is forcibly stopped by the electromagnetic switching valve 30 separately from the control of the servo motor M2 as the drive part of the housing cylinder 24, the time between when the piston 24p starts to decelerate and when it stops is reduced. Thus, the acceleration performance of the piston 16p of the injection cylinder 16 can be further improved.

(5) The operation of the piston 24p of the housing cylinder 24 is forcibly stopped by use of a mechanical arrangement, and thus the operation of the piston 24p can be surely stopped at a desired timing without relying on the accuracy and performance of the servo motor M2.

Third Embodiment

Hereinafter, a third embodiment in which the present invention has been embodied will be explained in accordance with FIG. 6.

Figure 6:
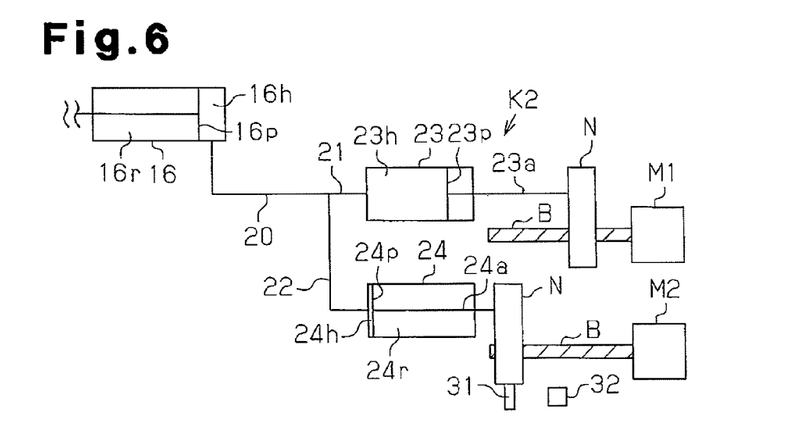
FIG. 6 is a schematic view showing an injection apparatus according to a third embodiment of the present invention.

FIG. 6 shows only an arrangement necessary to explain the third embodiment, and the arrangement not shown is identical with that of the first embodiment.

In the third embodiment, an abutting member 31 capable of abutting against a stopper 32 is fixed to the nut N coupled to the piston rod 24a of the housing cylinder 24. Also, the stopper 32 is fixed onto a base of the die cast machine 10. The stopper 32 is arranged in a position where the abutting member 31 abuts at the timing T2 close to the end of the low-speed step. This makes it impossible for the housing cylinder 24 to move backward after the abutting member 31 has abutted against the stopper 32. The piston 24p of the housing cylinder 24 then stops. That is, the expansion of the volume of the head side chamber 24h of the housing cylinder 24 stops. In this embodiment, the abutting member 31 and the stopper 32 constitute a forcible stopping part which forcibly stops the operation of the piston 24p of the housing cylinder 24 separately from the control of the servo motor M2 as the drive part of the housing cylinder 24. According to this embodiment, effects similar to the effects (1) to (3) of the first embodiment and to the effects (4) and (5) of the second embodiment can be obtained.

Fourth Embodiment

Hereinafter, a fourth embodiment in which the present invention has been embodied will be explained in accordance with FIG. 7.

Figures 7A, 7B:
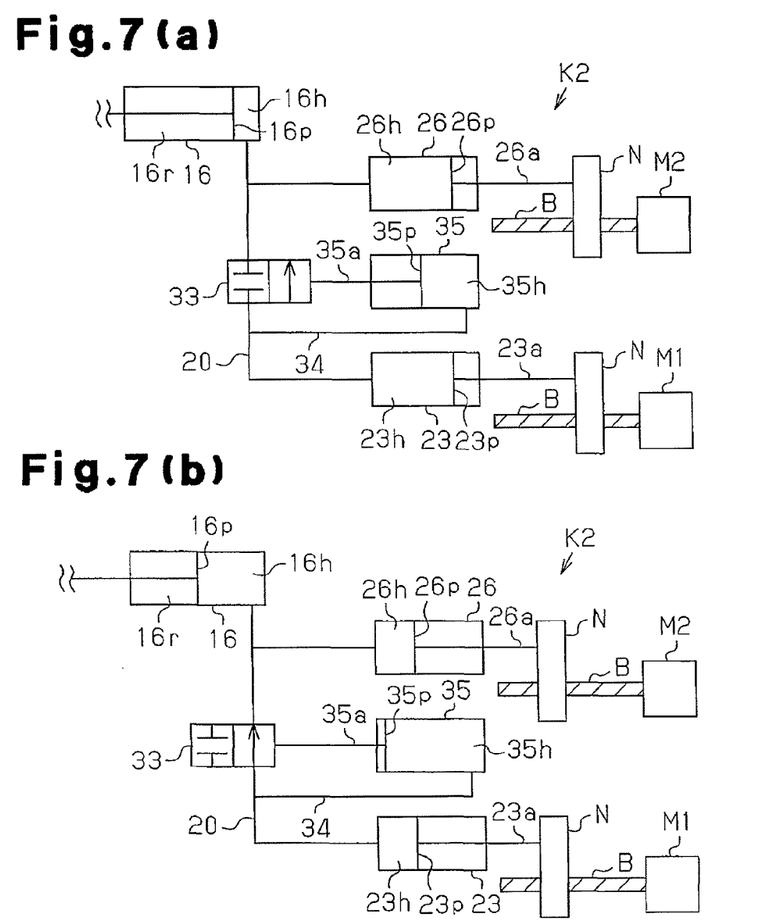
FIGS. 7(a) and 7(b) are schematic views showing an injection apparatus according to a fourth embodiment of the present invention.

FIGS. 7(a) and 7(b) show only an arrangement necessary to explain the fourth embodiment, and the arrangement not shown is identical with that of the first embodiment. In the meantime, the housing cylinder 24 of the first embodiment is omitted in the fourth embodiment.

The actuating cylinder 23 is connected to the main line 20 that is connected to the head side chamber 16h of the injection cylinder 16. An opening/closing valve 33 is intervened in the main line 20 between the injection cylinder 16 and the actuating cylinder 23. The opening/closing valve 33 can selectively take two positions: an opening position which makes it possible to supply the hydraulic oil from the actuating cylinder 23 to the injection cylinder and a closing position which makes it impossible to supply the hydraulic oil. An actuating cylinder 26 which supplies hydraulic oil to the injection cylinder 16 is connected to the main line 20 between the head side chamber 16h of the injection cylinder 16 and the opening/closing valve 33. The head side chamber 26h of the actuating cylinder 26 is connected to the main line 20. The piston rod 26a of the actuating cylinder 26 is coupled to the nut N. The nut N is screwed with the ball screw B to be rotated by the servo motor M2. The piston 26p of the actuating cylinder 26 is driven by the servo motor M2 via the ball screw B and the nut N.

Also, a sub line 34 is branched from the main line 20 between the actuating cylinder 23 and the opening/closing valve 33, and a cylinder 35 is connected to the sub line 34. A head side chamber 35h of the cylinder 35 is connected to the sub line 34. A piston rod 35a of the cylinder 35 is coupled to the opening/closing valve 33. The position of the opening/closing valve 33 is switched by utilizing the operating force of the piston 35p of the cylinder 35. In this embodiment, the opening/closing valve 33 and the cylinder 35 constitute a flow channel switching part which switches the flow channel for hydraulic oil to be forced out from the actuating cylinder 23. In this embodiment, the head side chamber 35h of the cylinder 35 functions as an accommodating chamber.

According to the arrangement of this embodiment, firstly, the hydraulic oil in an amount sufficient to operate the injection cylinder 16 in the low-speed step at the injection speed V1 is supplied to the injection cylinder 16. The actuating cylinder 23 is in the state where the opening/closing valve 33 is in the state shown in FIG. 7(a), i.e., in the closing position which makes it impossible to supply hydraulic oil. When the apparatus shifts from the state in FIG. 7(a) to the high-speed step, the hydraulic oil forced out from the head side chamber 23h in association with the operation of the actuating cylinder 23 is supplied through the main line 20 and the sub line 34 in turn to the head side chamber 35h of the cylinder 35.

The piston 35p of the cylinder 35 moves backward (leftward operation in FIG. 7) upon supply of hydraulic oil to the head side chamber 35h. In the meantime, the backward movement of the piston 35p is an operation in a direction of expanding the volume of the head side chamber 35h, and is also an operation in a direction of imparting the manipulating force for switching the position of the opening/closing valve 33. In the cylinder 35, the volume of the head side chamber 35h expands due to the backward movement of the piston 35p as much as the reduction in volume of the head side chamber 23h due to the forward movement of the piston 23p of the actuating cylinder 23.

In this embodiment, the amount of movement of the piston 23p (amount of hydraulic oil to be forced out) and the amount of movement of the piston 35p of the cylinder 35 are controlled such that the position of the opening/closing valve 33 is switched from the closing position to the opening position when the speed of the piston 23p of the actuating cylinder 23 reaches a desired speed. Therefore, the cylinder 35 imparts the manipulating force for switching the position of the opening/closing valve 33 to the opening/closing valve 33, once the amount of movement of the piston 35p in accordance with the amount of hydraulic oil which has flowed into the head side chamber 35h reaches a predetermined amount. The opening/closing valve 33 is switched from the closing position to the opening position as shown in FIG. 7(b) by this manipulating force.

Thereafter, the hydraulic oil forced out from the head side chamber 23h of the actuating cylinder 23 joins the hydraulic oil to be forced out from the actuating cylinder 26 to flow into the head side chamber 16h of the injection cylinder 16 through the main line 20. Due to this, the speed of the piston 16p of the injection cylinder 16 becomes the desired injection speed V2. In the meantime, once the opening/closing valve 33 is switched, the piston 35p of the cylinder 35 abuts against a step end, and does not move any more, and thus the expansion of the volume of the head side chamber 35h also stops. The hydraulic oil forced out from the head side chamber 23h of the actuating cylinder 23 stops flowing into the head side chamber 35h of the cylinder 35. In the meantime, after completion of injection molding, the hydraulic oil within the head side chamber 16h of the injection cylinder 16 and the head side chamber 35h of the cylinder 35 is returned to the head side chamber 23h of the actuating cylinder 23 through a circuit for returning oil not shown.

According to this embodiment, the acceleration performance of the piston 16p of the injection cylinder 16 improves based on a principle similar to that of the first embodiment. In the meantime, since hydraulic oil is supplied to the cylinder 35 to operate the piston 35p, the back pressure resistance from the cylinder 35 is added to the actuating cylinder 23. However, this back pressure resistance is sufficiently small as compared with the back pressure resistance to be added in the case where the injection cylinder 16 is operated by the actuating cylinder 23 alone. Therefore, a major part of the motor torque of the servo motor M1 which drives the actuating cylinder 23 can be used for acceleration of the piston 23p.

Thus, according to this embodiment, the following effects can be obtained in addition to the effects (1) to (3) of the first embodiment.

(6) The position of the opening/closing valve 33 is switched using the cylinder 35 into which the hydraulic oil forced out from the actuating cylinder 23 flows. Specifically, an arrangement (cylinder 35) necessary to prevent the application of back pressure when the piston 23p of the actuating cylinder 23 is accelerated and also functions as an arrangement which imparts the manipulating force for switching the position of the opening/closing valve 33. Therefore, the arrangement of the die cast machine 10 can be simplified.

(7) Also, since the operating force of the piston 35p of the cylinder 35 is a pressure of the hydraulic oil forced out from the actuating cylinder 23, the acceleration performance of the injection cylinder 16 can be improved by the servo motor M1. Thus, the arrangement of the die cast machine 10 can be simplified, and also the cost increase can be suppressed.

(8) Since the operation of the injection cylinder 16 can be highly accelerated by the opening/closing valve 33 and the cylinder 35, the operation of the injection cylinder 16 can be highly accelerated by using the same servo motor as a conventional one without employing a high-performance servo motor in the highly acceleration of the operation of the injection cylinder 16.

Fifth Embodiment

Hereinafter, a fifth embodiment in which the present invention has been embodied will be explained in accordance with FIG. 8.

Figure 8:
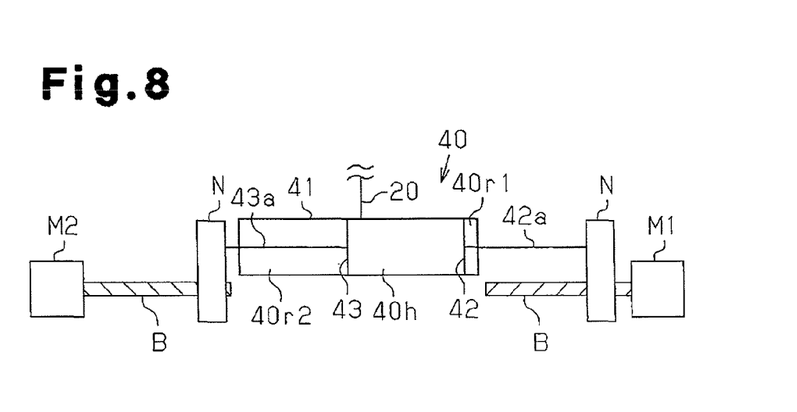
FIG. 8 is a schematic view showing an injection apparatus according to a fifth embodiment of the present invention.

FIG. 8 shows only an arrangement necessary to explain the fifth embodiment, and the arrangement not shown is identical with that of the first embodiment. In the meantime, in the fifth embodiment, an actuating cylinder 40 in which the housing cylinder 24 is integrated with the actuating cylinder 23 is provided. In the fifth embodiment, the main line 20 connected to the actuating cylinder 40 is connected to the head side chamber 16h of the injection cylinder 16, and the actuating cylinder 40 supplies hydraulic oil to the injection cylinder 16.

In the actuating cylinder 40 of this embodiment, a first piston 42 and a second piston 43 are held within a single cylinder tube 41. A piston rod 42a of the first piston 42 and a piston rod 43a of the second piston 43 respectively protrude from mutually opposite end surfaces of the cylinder tube 41. Inside the cylinder tube 41, a head side chamber 40h is formed as an operation chamber which supplies hydraulic oil to the injection cylinder 16 between the first piston 42 and the second piston 43. Also, inside the cylinder tube 41, a rod side chamber 40r1 is formed on the right side, in FIG. 8, of the first piston 42, and a rod side chamber 40r2 is formed on the left side, in FIG. 8, of the second piston 43. In the meantime, as will be described later, a head side chamber 40h is reduced in volume by the forward movement (leftward operation in FIG. 8) of the first piston 42, while the volume thereof increases due to the backward movement (leftward operation in FIG. 8) of the second piston 43. The increased volume portion of the head side chamber 40h created by the backward movement of this second piston 43 acts as an accommodating chamber in this embodiment.

The piston rod 42a of the first piston 42 is coupled to the nut N. The nut N is screwed with the ball screw B to be rotated by the servo motor M1 as a drive part. Also, the piston rod 43a of the second piston 43 is coupled to the nut N. The nut N is screwed with the ball screw B to be rotated by the servo motor M2 as a drive part. The actuating cylinder 40 is such that the operation of the first piston 42 and the second piston 43 is controlled by the servo control of the respective servo motors M1, M2.

According to the arrangement of this embodiment, at the time of acceleration of the injection cylinder 16, the servo motor M1 is controlled so that the first piston 42 moves forward, whereas the servo motor M2 is controlled so that the second piston 43 moves backward.

Thereafter, the servo motor M2 is controlled to stop the operation of the second piston 43 when the speed of the first piston 42 and the second piston 43 has reached at the desired speed corresponding to the injection speed V2 of the injection cylinder 16. In the meantime, the control of the first piston 42 maintains the current state. Once the operation of the second piston 43 stops, the hydraulic oil within the head side chamber 40h is forced out into the main line 20 by the first piston 42, which has reached a high speed. As a result, all the hydraulic oil forced out from the head side chamber 40h flows into the head side chamber 16h of the injection cylinder 16 through the main line 20. Due to this, the speed of the piston 16p of the injection cylinder 16 becomes the injection speed V2.

In the arrangement of this embodiment, the first piston 42 functions equivalently to the piston 23p of the actuating cylinder 23 explained for the first embodiment, while the second piston 43 functions equivalently to the piston 24p of the housing cylinder 24 explained for the first embodiment. Therefore, according to this embodiment, the acceleration performance of the piston 16p of the injection cylinder 16 improves based on a principle similar to that of the first embodiment.

Thus, according to this embodiment, the following effects can be obtained in addition to the effects (1) to (3) of the first embodiment.

(9) The supply of hydraulic oil to the injection cylinder 16 is controlled by the operation of the first piston 42 and the second piston 43 that are accommodated in a single cylinder tube 41. Due to this, it is possible to hold the first piston 42 and the second piston 43 in separate cylinder tubes and to simplify the arrangement of the die cast machine 10 as compared with the case where a circuit for operating the piston 16p of the injection cylinder 16 is constituted.

Sixth Embodiment

Figure 9A:
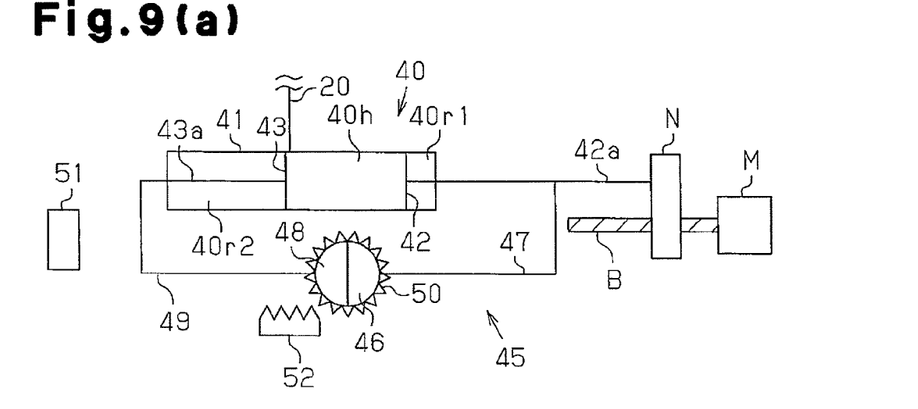
FIGS. 9(a) to 9(c) are schematic views showing an injection apparatus according to a sixth embodiment of the present invention.

Hereinafter, a sixth embodiment in which the present invention has been embodied will be explained in accordance with FIG. 9.

The sixth embodiment is configured to similarly control the actuating cylinder 40 explained for the fifth embodiment using a single servo motor M.

The actuating cylinder 40 in this embodiment is such that the nut N is coupled to the piston rod 42a of the first piston 42. The nut N is screwed with the ball screw B to be rotated by the servo motor M as a drive part. The actuating cylinder 40 includes a coupling mechanism 45 which separably couples the first piston 42 and the second piston 43. In the meantime, an actuating cylinder 26 for a low-speed step is connected to the main line 20 between the injection cylinder 16 and the actuating cylinder 40 as with the fourth embodiment, though not shown, and hydraulic oil is supplied only from the actuating cylinder 26 to the injection cylinder 16 during the low-speed step.

The coupling mechanism 45 includes a first arm member 47 fixed to the piston rod 42a and attached with a first coupling member 46 to its tip end and a second arm member 49 fixed to the piston rod 43a and attached with a second coupling member 48 to its tip end. Each of the first coupling member 46 and the second coupling member 48 is obtained by machining a cylindrical shaft into a semi-cylindrical shaft having a semicircular cross-section. The first coupling member 46 and the second coupling member 48 are respectively coupled to the distal ends of the first arm member 47 and the second arm member 49 in a rotatable manner. The machined surfaces of the first coupling member 46 and the second coupling member 48 are coupled together to form a single rotation shaft. A pinion 50 is attached to the first coupling member 46.

A stopper 51 against which the second arm member 49 abuts is fixed onto the base of the die cast machine 10. The stopper 51 is arranged in a position where it abuts against the second arm member 49 when the speed of the first piston 42 has reached a desired speed. Due to this, the second piston 43 cannot move backward since the second arm member 49 abuts against the stopper 51 when the first piston 42 has reached a desired speed. As a result, the second piston 43 stops.

A rack 52 with which the pinion 50 is engaged is fixed onto the base of the die cast machine 10. When the first coupling member 46 and the second coupling member 48 are in face contact with each other at a phase where their interface is perpendicular to the operating direction of the first piston 42 and the second piston 43 as shown in FIG. 9(a), the thrust force of the first arm member 47 can be transmitted to the second piston 43, thereby coupling the first piston 42 and the second piston 43 to each other. Also, once the pinion 50 is engaged with the rack 52 in the state where the first coupling member 46 and the second coupling member 48 are in face contact with each other at a phase where their interface is perpendicular to the operating direction of the first piston 42 and the second piston 43, rotation force along the operation direction of the first piston 42 and the second piston 43 is imparted. Once the first coupling member 46 and the second coupling member 48 to which the rotation force has been imparted enter a phase in which their interface is aligned with the horizontal direction, or the operating direction of the first piston 42 and the second piston 43, by rotating them 90 degrees from the state where they are in face contact with each other at a phase where they are perpendicular to the operating direction of the first piston 42 and the second piston 43 as shown in FIG. 9(c), the thrust force of the first arm member 47 cannot be transmitted to the second piston 43, and the coupling between the first piston 42 and the second piston 43 is released. Therefore, the rack 52 is arranged in a position for releasing the coupling between the first piston 42 and the second piston 43, when the speed of the first piston 42 has reached the desired speed.

According to the arrangement of this embodiment, the servo motor M is controlled to move the first piston 42 forward. Also, at the beginning of the high-speed step, as shown in FIG. 9(a), the first coupling member 46 and the second coupling member 48 are in face contact at a phase where their interface is perpendicular to the operating direction of the first piston 42 and the second piston 43, thereby coupling the first piston 42 and the second piston 43. Therefore, the forward movement of the first piston 42 causes transmission of the thrust power via the coupling mechanism 45 to the second piston 43 coupled to the first piston 42. Thus, the first piston 42 and the second piston 43 are such that the second piston 43 moves backward while the first piston 42 moves forward in the state where it maintains the volume of the head side chamber 40h.

Also, in this state, the hydraulic oil within the head side chamber 40h is not forced out into the main line 20, so that no driving force is imparted to the piston 16p of the injection cylinder 16; thus, the piston 16p does not operate. Also, due to the forward movement of the first piston 42 and the backward movement of the second piston 43, the volume of the head side chamber 40h does not change, but the volume of the rod side chamber 40r1 expands, and the volume of the rod side chamber 40r2 decreases.

Figure 9B:
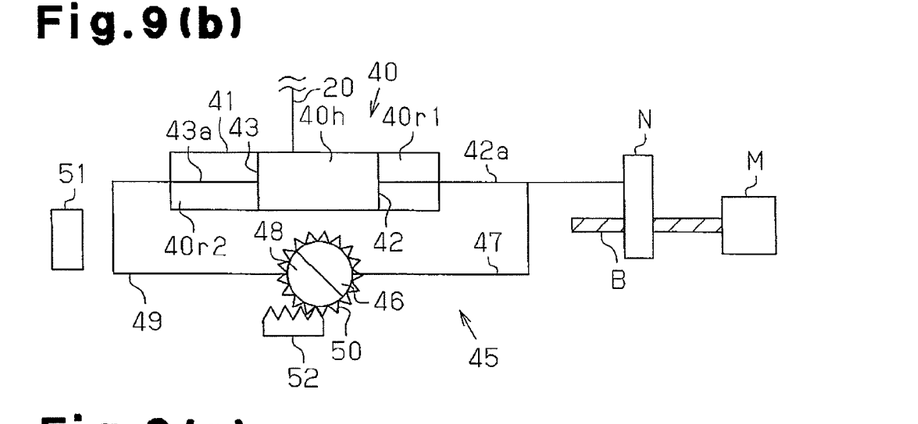

Thereafter, when the speed of the first piston 42 becomes close to the desired speed corresponding to the injection speed V2 of the injection cylinder 16, the pinion 50 of the first coupling member 46 is engaged with the rack 52, as shown in FIG. 9(b). The pinion 50 which is engaged with the rack 52 rotates in conformity with the operation of the first piston 42 and the second piston 43, whereby the first coupling member 46 and the second coupling member 48 also rotate.

Figure 9C:
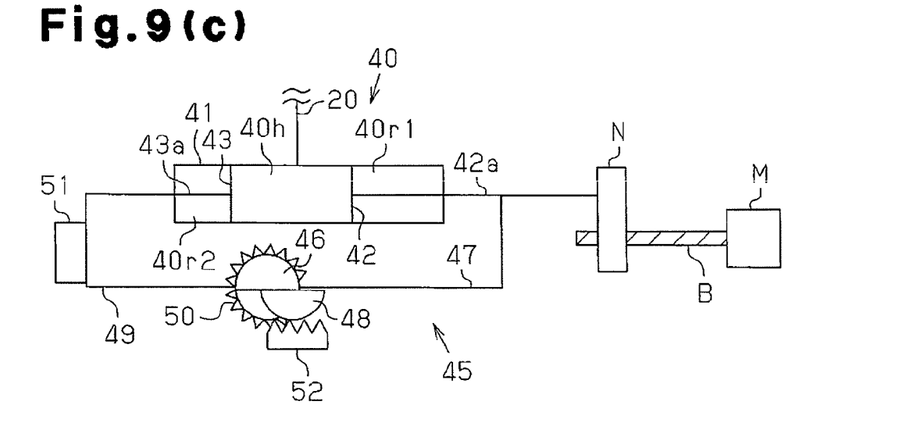

Then, when the speed of the first piston 42 reaches the desired speed corresponding to the injection speed V2 of the injection cylinder 16, the coupling between the first coupling member 46 and the second coupling member 48 is released as shown in FIG. 9(c), and the coupling between the first piston 42 and the second piston 43 is also released. Also, the second piston 43 cannot move backward due to the fact that the second arm member 49 abuts against the stopper 51 when the speed of the first piston 42 reaches the desired speed. The second piston 43 then stops. In this embodiment, the second arm member 49 and the stopper 51 constitute a forcible stopping part which forcibly stops the operation of the second piston 43.

On the other hand, the control of the first piston 42 maintains the current state. Therefore, the hydraulic oil within the head side chamber 40h is forced out into the main line 20 by the first piston 42, in the state where the operation of the second piston 43 stops and also where the coupling with the second piston 43 is released. As a result, all the hydraulic oil forced out from the head side chamber 40h flows into the head side chamber 16h of the injection cylinder 16 through the main line 20. Due to this, the speed of the piston 16p of the injection cylinder 16 becomes the same as the injection speed V2.

In the arrangement of this embodiment, the first piston 42 functions equivalently to the piston 23p of the actuating cylinder 23 explained for the first embodiment, while the second piston 43 functions equivalently to the piston 24p of the housing cylinder 24 explained for the first embodiment. Therefore, according to this embodiment, the acceleration performance of the piston 16p of the injection cylinder 16 improves based on a principle similar to that of the first embodiment.

Thus, according to this embodiment, the following effects can be obtained in addition to the effects (1) to (3) of the first embodiment and the effect (9) of the fifth embodiment.

(10) The actuating cylinder 40 is controlled by the single servo motor M, and thus can contribute to the suppression of the cost increase of the die cast machine 10.

(11) Since the mechanical arrangement is used to stop the operation of the second piston 43 of the actuating cylinder 40 and to release the coupling between the first piston 42 and the second piston 43, the stop of the operation of the second piston 43 and the release of the coupling between the first piston 42 and the second piston 43 can be surely carried out, without relying on the accuracy and performance of the servo motor M.

In the meantime, the above respective embodiments may be changed as follows.

A braking device may be provided as a mechanism which stops the operation of the piston 24p of the housing cylinder 24 and the second piston 43, in a rotation shaft of the servo motor M for the purpose of reducing the time before the servo motor M stops.

In the fourth embodiment, the arrangement of the flow channel switching part may be changed. The flow channel switching part may, for example, have an accommodating chamber and a valve body structure which can switch the flow channel by the operation of the hydraulic oil which has flowed into the accommodating chamber.

In the sixth embodiment, the arrangement of the coupling mechanism may be changed.

In the respective embodiments, a plurality of actuating cylinders which supply hydraulic oil to the injection cylinder 16 may be used. Hydraulic oil may be supplied from the plurality of actuating cylinders to the injection cylinder 16.

In the respective embodiments, the drive parts of the actuating cylinders 23, 26 and 40 as well as the housing cylinder 24 may be a linear motor.

The respective embodiments may be embodied into an injection apparatus for injecting a resin material into a cavity 13 to produce a resin molded article.

What is claimed is:

1. An injection apparatus which injects a molding material into a mold by operating an injection cylinder, and fills the mold with the molding material, comprising:
an actuating cylinder which has an operation chamber and a piston that is accommodated in the operation chamber and supplies an incompressible fluid to the injection cylinder by forcing out the incompressible fluid inside the operation chamber with the piston;
an accommodating chamber which is connected to the operation chamber, and holds at least some of the incompressible fluid that flows out from the operation chamber due to the piston being pushed out; and
a volume changing part configured to expand the volume of the accommodating chamber, at a period one of before or simultaneously with a start of an acceleration of the piston of the actuating cylinder, and to stop the expansion of the volume when the operating speed of the piston of the actuating cylinder has reached a desired speed, wherein
the accommodating chamber is an operation chamber of a housing cylinder which is separate from the actuating cylinder,
the volume changing part includes a piston of the housing cylinder and a drive part which drives the piston, and
the drive part expands the volume of the operation chamber of the accommodating chamber by operating the piston, at the latest simultaneously with the start of acceleration of the actuating cylinder.

2. The injection apparatus according to claim 1, wherein the volume changing part includes a forcible stopping part which forcibly stops the operation of the piston of the housing cylinder separately from the control of the drive part of the housing cylinder, and
the forcible stopping part stops the expansion of the volume by forcibly stopping the operation of the piston of the housing cylinder when the operating speed of the actuating cylinder has reached the desired speed.

3. The injection apparatus according to claim 1, wherein the operation of the injection cylinder is carried out in a low-speed step, a high-speed step and a pressure-increasing step in this order, and
the desired speed of the piston of the actuating cylinder is a speed corresponding to the high-speed step.

4. An injection apparatus which injects a molding material into a mold by operating an injection cylinder, and fills the mold with the molding material, comprising:
an actuating cylinder which has an operation chamber and a piston that is accommodated in the operation chamber and supplies an incompressible fluid to the injection cylinder by forcing out the incompressible fluid inside the operation chamber with the piston;
an accommodating chamber which is connected to the operation chamber, and holds at least some of the incompressible fluid that flows out from the operation chamber due to the piston being pushed out;
a volume changing part configured to expand the volume of the accommodating chamber, at a period one of before or simultaneously with a start of an acceleration of the piston of the actuating cylinder, and to stop the expansion of the volume when the operating speed of the piston of the actuating cylinder has reached a desired speed; and
a line which connects the injection cylinder and the actuating cylinder, wherein
the volume changing part includes a flow channel switching part intervened in the line,
the flow channel switching part includes the accommodating chamber, and
when the operating speed of the piston of the actuating cylinder has reached the desired speed, the flow channel switching part stops the expansion of the volume by switching the flow channel, through which the incompressible fluid to be forced out from the operation chamber of the actuating cylinder flows, from a flow channel which directs the incompressible fluid toward the accommodating chamber to a flow channel which directs the incompressible fluid toward the injection cylinder.

5. An injection apparatus which injects a molding material into a mold by operating an injection cylinder, and fills the mold with the molding material, comprising:
an actuating cylinder which has an operation chamber and a piston that is accommodated in the operation chamber and supplies an incompressible fluid to the injection cylinder by forcing out the incompressible fluid inside the operation chamber with the piston;
an accommodating chamber which is connected to the operation chamber, and holds at least some of the incompressible fluid that flows out from the operation chamber due to the piston being pushed out; and a volume changing part configured to expand the volume of the accommodating chamber, at a period one of before or simultaneously with a start of an acceleration of the piston of the actuating cylinder, and to stop the expansion of the volume when the operating speed of the piston of the actuating cylinder has reached a desired speed, wherein the actuating cylinder includes a single cylinder tube which holds the piston as a first piston and a second piston accommodated in the cylinder tube, the operation chamber is defined between the first and second pistons, the actuating cylinder forces out the incompressible fluid inside the operation chamber by at least one of the first and second pistons, thereby supplying the incompressible fluid to the injection cylinder, the injection apparatus further comprises a drive part which drives the first and second pistons, the drive part moves the first and second pistons in the same direction until the operating speed of the first piston of the actuating cylinder reaches the desired speed, and when the operating speed of the first piston of the actuating cylinder has reached the desired speed, the drive part stops the drive of the second piston and forces out the incompressible fluid inside the operation chamber by the first piston.

* * * * *